United States Patent
Natori (10) Patent No.: US 11,346,948 B2
(45) Date of Patent: May 31, 2022

(54) TARGET DETECTION SYSTEM TO DETERMINE POSITION OF TARGET USING SCATTERED LIGHT AND A REFERENCE LIGHT

(71) Applicant: SUBARU CORPORATION, Tokyo (JP)

(72) Inventor: Shohei Natori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 515 days.

(21) Appl. No.: 16/514,579

(22) Filed: Jul. 17, 2019

(65) Prior Publication Data
US 2020/0103528 A1 Apr. 2, 2020

(30) Foreign Application Priority Data
Sep. 28, 2018 (JP) .............................. JP2018-185106

(51) Int. Cl.
*G01S 17/48* (2006.01)
*G01S 17/04* (2020.01)

(52) U.S. Cl.
CPC .............. *G01S 17/48* (2013.01); *G01S 17/04* (2020.01)

(58) Field of Classification Search
CPC .......... G01S 17/48; G01S 17/04; G01S 17/46; G01S 17/003
See application file for complete search history.

(56) References Cited

U.S. PATENT DOCUMENTS

| 6,917,415 B2 * | 7/2005 | Gogol | G01S 7/4861 356/5.03 |
|---|---|---|---|
| 2016/0061952 A1 * | 3/2016 | Tsuji | G01S 17/88 356/5.01 |
| 2021/0011157 A1 * | 1/2021 | Onohara | G01S 17/34 |

FOREIGN PATENT DOCUMENTS

JP           03-94185 A       4/1991

* cited by examiner

*Primary Examiner* — Jennifer D Bennett
(74) *Attorney, Agent, or Firm* — McDermott Will & Emery LLP (57) ABSTRACT

A target detection system includes a receiving apparatus separated from a transmitting apparatus configured to transmit inspection light and reference light. The receiving apparatus includes a photodetector, a scattered light processor, and a target detector. The photodetector is configured to receive light and detect scattered light and the reference light from the received light. The scattered light is scattered in a transmission path of the inspection light. The target detector is configured to perform target position determination. The target position determination determines, as a position of a target, a position, on the transmission path, corresponding to a first-transition time. The first-transition time is a time at which intensity of the scattered light becomes equal to or smaller than a first transition. The target position determination is performed on the basis of a time difference between the first-transition time and a reception time of the reference light.

5 Claims, 6 Drawing Sheets

TARGET DETECTION SYSTEM TO DETERMINE POSITION OF TARGET USING SCATTERED LIGHT AND A REFERENCE LIGHT

CROSS-REFERENCE TO RELATED APPLICATIONS

The present application claims priority from Japanese Patent Application No. 2018-185106 filed on Sep. 28, 2018, the entire contents of which are hereby incorporated by reference.

BACKGROUND

The present technology relates to a target detection system that detects a target present at a position in an in-air region.

Japanese Unexamined Patent Application Publication No. H03-94185 discloses an example of a technique that detects a stealth target by means of radar. In this technique, a main site transmits electric waves. Two sub-sites receive forward-scattered waves that are related to a target and derived from the electric waves. The two sub-sites transmit the received waves back toward the target. The main site receives, in turn, forward-scattered waves newly derived from the waves transmitted back by the sub-sites. The target is thus detected.

SUMMARY

An aspect of the technology provides a target detection system that includes a transmitting apparatus and a receiving apparatus separated from the transmitting apparatus. The transmitting apparatus includes an inspection light transmitter and a reference light transmitter. The inspection light transmitter is configured to transmit inspection light. The reference light transmitter is configured to transmit reference light to the receiving apparatus. The receiving apparatus includes a photodetector, a scattered light processor, and a target detector. The photodetector is configured to receive light and detect scattered light and the reference light from the received light. The scattered light is scattered in a transmission path of the inspection light. The scattered light processor is configured to determine an over-time transition of intensity of the scattered light detected by the photodetector. The target detector is configured to perform target position determination in a case where the intensity of the scattered light becomes equal to or smaller than a predetermined first transition in the over-time transition of the intensity of the scattered light. The target position determination determines, as a position of a target, a position, on the transmission path, corresponding to a first-transition time. The first-transition time is a time at which the intensity of the scattered light becomes equal to or smaller than the first transition. The target position determination is performed on the basis of a time difference between the first-transition time and a reception time of the reference light.

An aspect of the technology provides a target detection system that includes a transmitting apparatus and a receiving apparatus separated from the transmitting apparatus. The transmitting apparatus includes an inspection light transmitter and a reference light transmitter. The inspection light transmitter is configured to transmit inspection light. The reference light transmitter is configured to transmit reference light to the receiving apparatus. The receiving apparatus includes a photodetector and circuitry. The photodetector is configured to receive light and detect scattered light and the reference light from the received light. The scattered light is scattered in a transmission path of the inspection light. The circuitry is configured to determine an over-time transition of intensity of the scattered light detected by the photodetector. The circuitry is configured to perform target position determination in a case where the intensity of the scattered light becomes equal to or smaller than a predetermined first transition in the over-time transition of the intensity of the scattered light. The target position determination determines, as a position of a target, a position, on the transmission path, corresponding to a first-transition time. The first-transition time is a time at which the intensity of the scattered light becomes equal to or smaller than the first transition. The target position determination is performed on the basis of a time difference between the first-transition time and a reception time of the reference light.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Some example embodiments of the technology are described below in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description, and elements not in direct relation to the technology may not be illustrated.

There is a technique that detects a target by transmitting light from a transmission point and receiving light reflected by the target, i.e., reflected light, at a reception point. In a case where the target is a stealth target, however, intensity of light reflected by the target is extremely small. It is therefore difficult to receive the reflected light at the reception point. This makes it difficult to detect the stealth target by means of light.

It is desirable to provide a target detection system that is able to detect a target present at a position in an in-air region by means of light.

Figure 1:
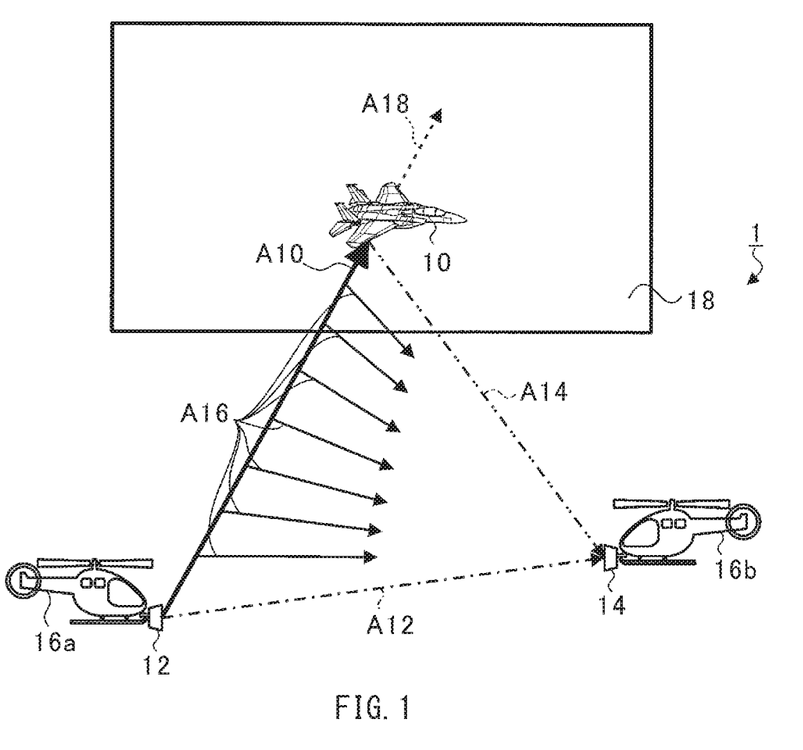
FIG. 1 is an explanatory diagram for describing an example of an outline of a target detection system according to one embodiment of the technology.

FIG. 1 describes an outline of a target detection system 1 according to an example embodiment of the technology. The target detection system 1 may detect a target 10 that is present at a position in an in-air region. Non-limiting examples of the target 10 may include a stealth aircraft. Stealth is a technique that makes it difficult for an object to be observed by a sensor such as a radar device. As used herein, a "stealth target" refers to a target observation of which by a sensor is made more difficult by the technique of stealth.

The target detection system 1 includes a transmitting apparatus 12 and a receiving apparatus 14. The transmitting apparatus 12 may be mounted on, for example, a helicopter 16a. The receiving apparatus 14 may be mounted on another helicopter 16b different from the helicopter 16a on which the transmitting apparatus 12 is mounted. Upon detection of the target 10, the helicopters 16a and 16b may be separated from each other in air and kept at the respective separated positions. In other words, the helicopters 16a and 16b may hover at the respective separated positions upon the detection of the target 10. Accordingly, the transmitting apparatus 12 and the receiving apparatus 14 may be positioned in the air while being separated from each other upon the detection of the target 10. A positional relationship between the transmitting apparatus 12 and the receiving apparatus 14 may not vary as each of the helicopters 16a and 16b maintains its position in the air. As used herein, the term "position" refers to a position in three-dimensional space.

The transmitting apparatus 12 may transmit light directed to detection of the target 10. Hereinafter, the light directed to the detection of the target 10 is referred to as inspection light. The transmitting apparatus 12 may transmit the inspection light toward target in-air region 18. The target in-air region 18 may be a region on which the detection of the target 10 is to be performed. In FIG. 1, a traveling direction of the inspection light is indicated by a solid arrow A10. The transmitting apparatus 12 may also transmit, toward the receiving apparatus 14, light separately from the inspection light. Hereinafter, the light transmitted to the receiving apparatus 14 is referred to as reference light. In FIG. 1, a traveling direction of the reference light is indicated by an arrow A12 of a dashed and single-dotted line. Each of the inspection light and the reception light may be, for example but not limited to, laser light.

The inspection light may be reflected when the inspection light hits the target 10. Hereinafter, the light reflected by the target 10 is referred to as reflected light. In FIG. 1, a traveling direction of the reflected light is indicated by an arrow A14 of a dashed and double-dotted line. In a case where the target 10 is not a stealth target, intensity of the reflected light is so high that the receiving apparatus 14 may be allowed to easily detect the reflected light.

In a case where the target 10 is a stealth target, the target 10 may tend to absorb the inspection light, which makes the intensity of the reflected light from the target 10 extremely small. Accordingly, the intensity of the reflected light from the target 10 is smaller in a case where the target 10 is a stealth target than in a case where the target 10 is a non-stealth target. For this reason, it is more difficult for the receiving apparatus 14 to detect the reflected light from the target 10 in the case where the target 10 is a stealth target.

The inspection light may be scattered, for example, by a particle or a molecule in the air. Hereinafter, the light scattered, for example, by a particle or a molecule in the air is referred to as scattered light. In FIG. 1, a traveling direction of the scattered light is indicated by a solid arrow A16. Scattered light derived from the inspection light may be generated on a transmission path of the inspection light. FIG. 1 illustrates a state in which a plurality of rays of scattered light are generated on the transmission path of the inspection light. The rays of scattered light are each indicated by the solid arrow A16.

The intensity of the inspection light may gradually decrease as a distance from the transmitting apparatus 12 increases. Accordingly, intensity of the scattered light at timing of generation of the scattered light may also gradually decrease as a distance from the transmitting apparatus 12 increases. The intensity of the scattered light may further decrease as a distance from a position at which the scattered light has been generated increases. In FIG. 1, the intensity of the scattered light is indicated by a length of the arrow A16. Smaller intensity of the scattered light is indicated by a shorter arrow A16. A gradual decrease in intensity among the rays of the scattered light is illustrated in FIG. 1.

When the inspection light hits the target 10, the target 10 may block the inspection light. This may cause absence of the inspection light in a region beyond the target 10. In FIG. 1, an arrow A18 of a broken line indicates that the inspection light does not travel beyond the target 10. Therefore, scattered light may not be generated in a direction in which the transmission path is extended beyond the target 10. As a result, the receiving apparatus 14 may detect no scattered light in the direction in which the transmission path is extended beyond the target 10.

In view of the above, the target detection system 1 according to one example embodiment may detect the scattered light derived from the inspection light by the receiving apparatus 14, and determine that the target 10, which is the cause of disruption of the inspection light and the scattered light, is present at a position where the detection of the scattered light is disrupted.

Figure 2A:
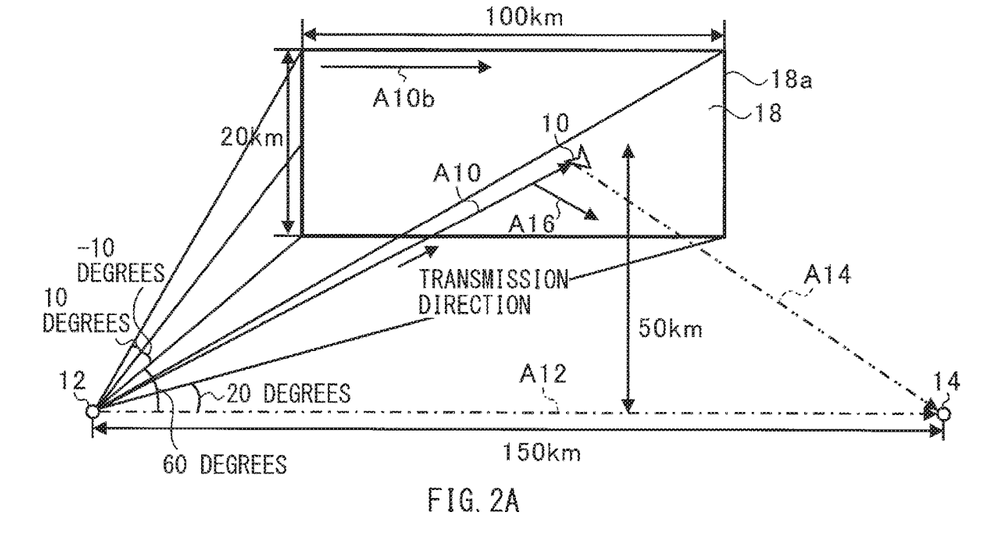
FIGS. 2A and 2B are each an explanatory diagram for describing an example of a detection region of the target detection system.
Figure 2B:
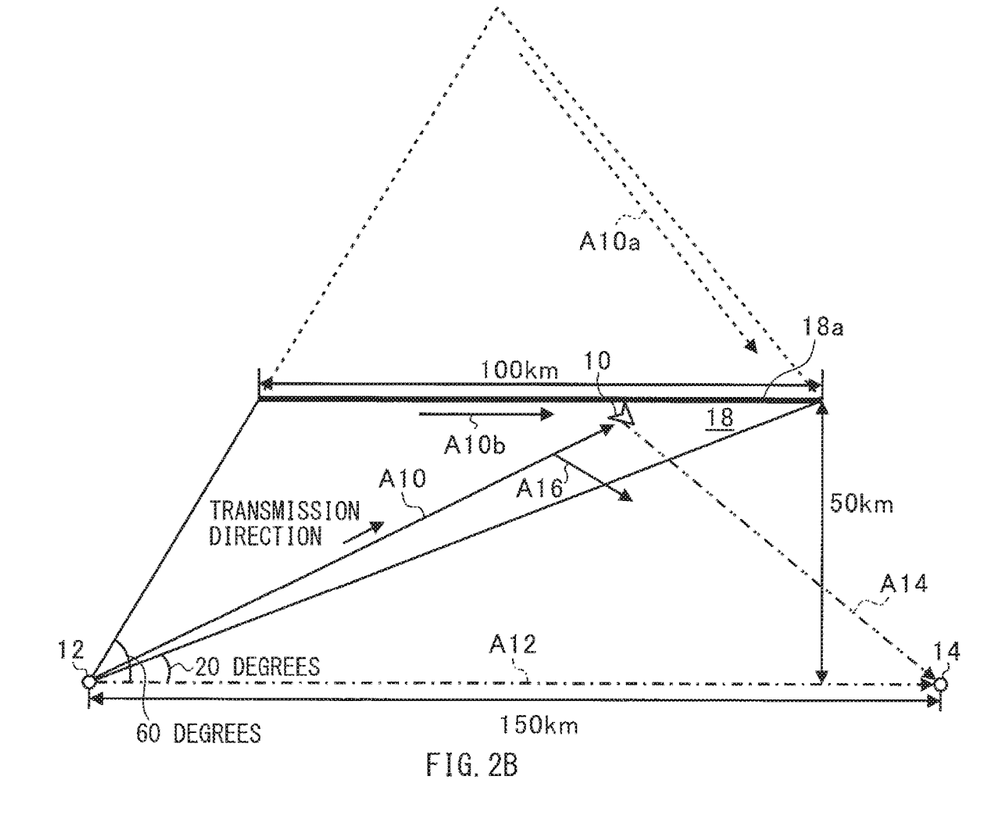

FIGS. 2A and 2B each describe an example of a detection region of the target detection system 1. FIG. 2A illustrates the detection region of the target detection system 1 including the target 10 in a birds-eye view. FIG. 2B is a plan view of the target detection system 1 including the target 10 viewed from the above.

The transmitting apparatus 12 and the receiving apparatus 14 are separated from each other. For example, the transmitting apparatus 12 and the receiving apparatus 14 may be separated from each other by a distance of 150 km. A straight line connecting the transmitting apparatus 12 and the receiving apparatus 14 is referred to as a reference line. The transmitting apparatus 12 may transmit the inspection light in a range from about 20 degrees to about 60 degrees in a horizontal direction with respect to the reference line and in a range from about −10 degrees to about 10 degrees in a vertical direction. When the inspection light is transmitted in the above-described ranges, the inspection light may be transmitted to the region 18a. The region 18a may be an in-air region that is about 50 km away from the reference line, is about 100 km long in a direction parallel to the reference line, and is about 20 km long in the vertical direction. The target in-air region 18 to which the transmission light is to be transmitted may include the above-described region 18a.

The transmitting apparatus 12 may sequentially transmit rays of the inspection light on an about-0.05-degree basis in the horizontal direction from a direction that is about 60 degrees with respect to the reference line toward a direction that is about 20 degrees with respect to the reference line. In other words, the transmitting apparatus 12 may sequentially transmit rays of the inspection light on an about-0.05-degree basis in the horizontal direction from upper-middle side to lower-right side in FIG. 2B as indicated by a broken line A10a. This may allow the region 18a to be scanned from left side toward right side in FIG. 2B as indicated by a solid line A10b. The transmitting apparatus 12 may repeatedly perform the sequential transmission of the rays of the inspection light in the horizontal direction on an about-0.05-degree basis from upper side in the vertical direction toward lower side of the vertical direction. In other words, the transmitting apparatus 12 may repeatedly perform the sequential transmission of the rays of the inspection light in the horizontal direction on the about-0.05-degree basis from upper side toward lower side in FIG. 2A. The transmitting apparatus 12 may scan the target in-air region 18 in the above-described manner. The transmitting apparatus 12 may scan, for example, the entire region of the target in-air region 18 in about 30 seconds.

Figure 3:
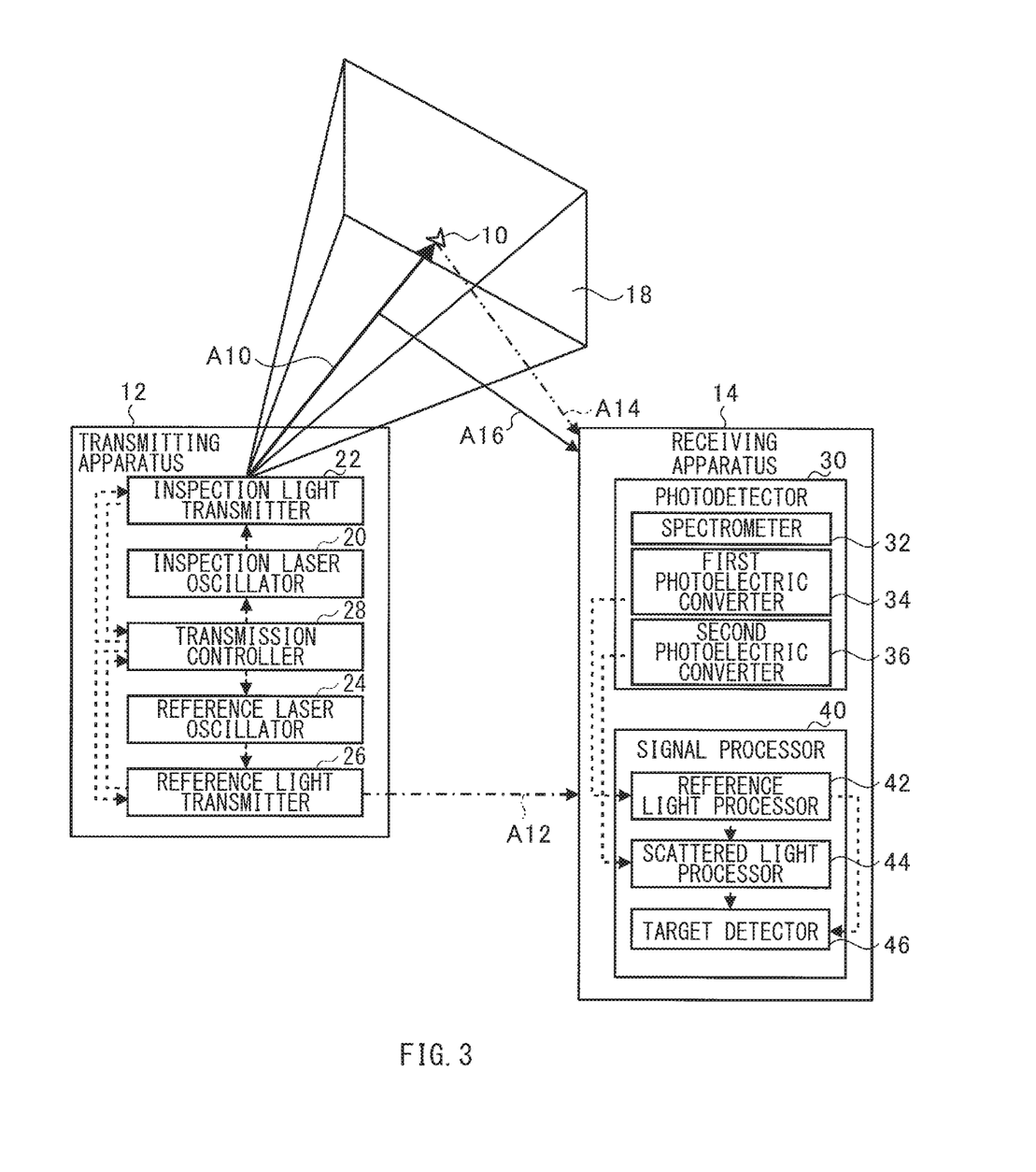
FIG. 3 is a schematic diagram illustrating an example of a configuration of the target detection system.

FIG. 3 is a schematic diagram illustrating a configuration of the target detection system 1. In FIG. 3, a signal flow is indicated by dashed arrows. The transmitting apparatus 12 may include, for example, an inspection laser oscillator 20, an inspection light transmitter 22, a reference laser oscillator 24, a reference light transmitter 26, and a transmission controller 28.

The inspection laser oscillator 20 may be controlled by the transmission controller 28 and thereby oscillate laser light which serves as the inspection light. The inspection laser oscillator 20 may be, for example, a device such as a semiconductor laser device or a solid-state laser device.

The inspection light transmitter 22 may scan the target in-air region 18 with the use of the inspection light oscillated by the inspection laser oscillator 20. The inspection light transmitter 22 may be controlled by the transmission controller 28 and thereby adjust an azimuth angle of a lens and an elevation angle of the lens to vary the transmission direction of the inspection light oscillated by the inspection laser oscillator 20, for example.

The reference laser oscillator 24 may be controlled by the transmission controller 28 and thereby oscillate laser light which serves as the reference light. The reference laser oscillator 24 may be, for example, a device such as a semiconductor laser device or a solid-state laser device. The reference laser oscillator 24 may output, for example, the reference light having a wavelength different from that of the inspection light, for example.

The reference light transmitter 26 may transmit, toward the receiving apparatus 14, the reference light oscillated by the reference laser oscillator 24. The reference light transmitter 26 may perform tracking control of the receiving apparatus 14, and so adjust the transmission direction of the reference light that the receiving apparatus 14 is positioned in the transmission direction of the reference light.

The transmission controller 28 may include a semiconductor integrated circuit. The semiconductor integrated circuit may include, for example, a central processing unit, a read-only memory (ROM) in which, for example, a program is stored, a random-access memory (RAM) serving as a work area. The transmission controller 28 may control each unit of the transmitting apparatus 12 by executing the program.

The transmission controller 28 may cause the inspection laser oscillator 20 to modulate the light intensity of the inspection light. In a specific but non-limiting example, when an electric current value exceeds a threshold for laser oscillation, the inspection laser oscillator 20 may oscillate the inspection light having intensity proportional to the electric current value. Therefore, when the electric current value of the inspection laser oscillator 20 varies, the intensity of the inspection light may also vary. The transmission controller 28 may therefore generate a scan modulation signal and supply the scan modulation signal to the inspection laser oscillator 20. The scan modulation signal may be an electric signal directed to varying of the electric current value of the inspection laser oscillator 20. The electric current value of the inspection laser oscillator 20 may vary in accordance with variation in intensity of the scan modulation signal supplied from the transmission controller 28. This may cause the inspection laser oscillator 20 to oscillate the inspection light whose intensity varies in accordance with the variation in the electric current value based on the scan modulation signal. The intensity of the inspection light may vary, for example, at about several megabits per second (Mbps).

The transmission controller 28 may also cause the reference laser oscillator 24 to modulate the light intensity of the reference light. In a specific but non-limiting example, the transmission controller 28 may generate a reference modulation signal, and supply the reference modulation signal to the reference laser oscillator 24. The reference modulation signal may be an electric signal directed to varying of an electric current value of the reference laser oscillator 24. The electric current value of the reference laser oscillator 24 may vary in accordance with variation in intensity of the reference modulation signal supplied from the transmission controller 28. This may cause the reference laser oscillator 24 to oscillate the reference light whose intensity varies in accordance with the variation in the electric current value based on the reference modulation signal. The intensity of the reference light may vary, for example, at about several Mbps.

When the transmission controller 28 causes the reference laser oscillator 24 to modulate the light intensity of the reference light, the transmission controller 28 may cause information indicating the transmission direction of the inspection light and information indicating the transmission direction of the reference light to be included in the reference light. For example, the transmission controller 28 may generate the reference modulation signal on the basis of a bit string indicating the transmission direction of the inspection light and a bit string indicating the transmission direction of the reference light. The reference laser oscillator 24 may perform laser oscillation on the basis of the reference modulation signal. This may allow the information indicating the transmission direction of the inspection light and the information indicating the transmission direction of the reference light to be included in the reference light.

The transmission controller 28 may also control scanning performed by the inspection light transmitter 22. In other words, the transmission controller 28 may also control the transmission direction of the inspection light. In a specific but non-limiting example, the transmission controller 28 may supply the inspection light transmitter 22 with each of information of the azimuth angle corresponding to the transmission direction of the inspection light and information of the elevation angle corresponding to the transmission direction of the inspection light. It is to be noted that the transmission controller 28 may associate the transmission direction of the inspection light with the azimuth angle and the elevation angle.

The transmission controller 28 may also so adjust the transmission direction of the reference light transmitted by the reference light transmitter 26 that the reference light directly reaches the receiving apparatus 14. In a specific but non-limiting example, the transmission controller 28 may so determine, on the basis of a detected relative direction of the receiving apparatus 14, a new transmission direction of the reference light that a difference between the relative direction of the receiving apparatus 14 and the current transmission direction of the reference light is reduced or eliminated. The transmission controller 28 may supply the determined new transmission direction of the reference light to the reference light transmitter 26. The reference light transmitter 26 may change the transmission direction of the reference light to the new transmission direction.

The transmission controller 28 may also cause the inspection light and the reference light to be transmitted at approximately the same time. When the transmission direction of the inspection light is updated to the new transmission direction, the transmission controller 28 may cause the reference light to be transmitted every time the inspection light is transmitted to the updated new transmission direction.

The receiving apparatus 14 may include, for example, a photodetector 30 and a signal processor 40. The photodetector 30 may receive light including the reference light, scattered light derived from the inspection light, and the reflected light derived from the inspection light. The photodetector 30 may detect the reference light, the scattered light, and the reflected light from the received light.

The photodetector 30 may include a spectrometer 32, a first photoelectric converter 34, and a second photoelectric converter 36. The spectrometer 32 may be, for example, a prism. The spectrometer 32 may separate the received light into light rays of respective wavelengths. The first photoelectric converter 34 and the second photoelectric converter 36 may each be, for example, a photodiode.

The first photoelectric converter 34 may receive light, out of the light spectroscopically separated by the spectrometer 32, that is in a first wavelength range centered on the wavelength of the reference light. The first photoelectric converter 34 may convert the input light in the first wavelength range into an electric signal and output the electric signal. The output signal output by the first photoelectric converter 34 may include a signal indicating the reference light. Hereinafter, the signal indicating the reference light is referred to as a reference signal.

The second photoelectric converter 36 may receive light, out of the light spectroscopically separated by the spectrometer 32, that is in a second wavelength range centered on the wavelength of the inspection light. The second photoelectric converter 36 may convert the input light in the second wavelength range into an electric signal and output the electric signal. It is to be noted that a wavelength of the scattered light and a wavelength of the reflected light may both approximately coincide with the wavelength of the inspection light. Therefore, the output signal output by the second photoelectric converter 36 may include a signal indicating the scattered light and a signal indicating the reflected light. Hereinafter, the signal indicating the scattered light is referred to as a scattering signal, and the signal indicating the reflected light is referred to as a reflection signal. The wavelength of the reflected light may slightly deviate from the wavelength of the inspection light; however, setting the second wavelength range in consideration of the deviation of the wavelength of the reflected light may allow the reflected signal to be included in the output signal output by the second photoelectric converter 36.

The signal processor 40 may include a semiconductor integrated circuit. The semiconductor integrated circuit may include, for example, a central processing unit, a ROM in which, for example, a program is stored, a RAM serving as a work area. The signal processor 40 may serve as a reference light processor 42, a scattered light processor 44, and a target detector 46 by executing the program.

The reference light processor 42 may determine a reception time of the reference light, i.e., a time at which the reference light is received, on the basis of the output signal output by the first photoelectric converter 34 of the photodetector 30. Before the photodetector 30 receives the reference light, amplitude of the output signal output by the first photoelectric converter 34 is small; however, the amplitude of the output signal output by the first photoelectric converter 34 becomes greater when the photodetector 30 starts receiving the reference light. For this reason, the reference light processor 42 may determine, as the reception time of the reference light, a time at which the amplitude of the output signal output by the first photoelectric converter 34 becomes greater than predetermined amplitude. The reference light processor 42 may determine the reception time of the reference light for each reception of the reference light transmitted in each transmission direction of the inspection light.

The reference light processor 42 may determine the transmission direction of the inspection light and the transmission direction of the reference light on the basis of the output signal output by the first photoelectric converter 34 of the photodetector 30. As described above, the reference light may include the information indicating the transmission direction of the inspection light and the information indicating the transmission direction of the reference light. Therefore, the reference light processor 42 may convert, into a digital signal, the output signal that is output by the first photoelectric converter 34 and whose amplitude varies over time. The reference light processor 42 may read the information indicating the transmission direction of the inspection light and the information indicating the transmission direction of the reference light from the bit strings indicated by the digital signal.

Figure 4:
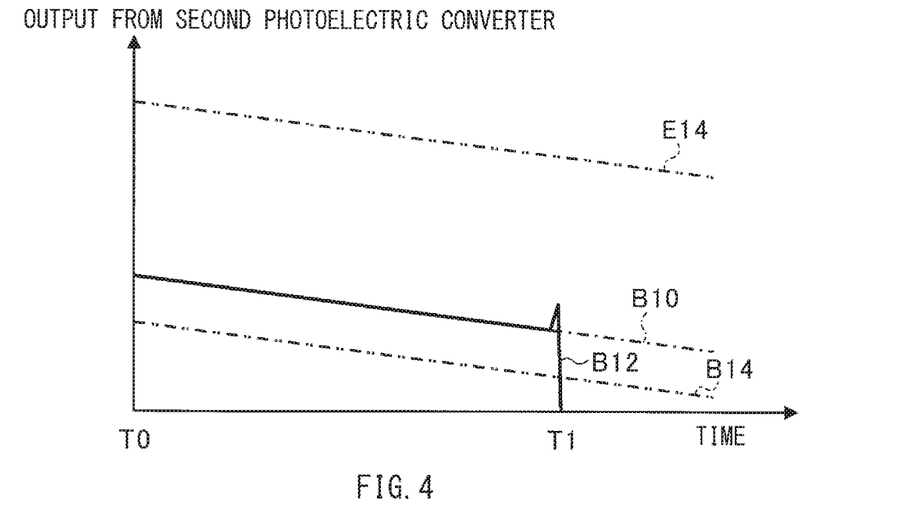
FIG. 4 is a diagram illustrating an example of an over-time transition of an output from a second photoelectric converter in a case where inspection light is transmitted in a single transmission direction.

FIG. 4 illustrates an over-time transition of the output from the second photoelectric converter 36 in a case where the inspection light is transmitted in a single transmission direction. As described above, the scattered light may be generated on the transmission path of the inspection light. Therefore, a time at which the scattered light generated in the vicinity of the transmitting apparatus 12 is detected by the receiving apparatus 14 and a time at which the scattered light generated at a position more distant from the transmitting apparatus 12 is detected by the receiving apparatus 14 may have a difference.

For example, as the reference light and the inspection light are transmitted at the same time or at approximately the same time, the scattered light generated in the immediate vicinity of the transmitting apparatus 12 may be detected by the receiving apparatus 14 at approximately the same time as a time at which the reference light is detected by the receiving apparatus 14. In contrast, the scattered light generated at a position more distant from the transmitting apparatus 12 may be detected by the receiving apparatus 14 being delayed from the reception time of the reference light. As the position at which the scattered light is generated is more distant from the transmitting apparatus 12, the reception time of the scattered light may be delayed more from the reception time of the reference light.

In FIG. 4, a time T0 indicates the reception time of the reference light and also indicates the reception time of the scattered light generated in the immediate vicinity of the transmitting apparatus 12. In FIG. 4, as a value on the horizontal axis is greater than the time T0, the reception time of the scattered light is delayed more. That is, the horizontal axis in FIG. 4 indicates a delay time of the reception time of the scattered light with respect to the reception time of the reference light. The delay time indicated on the horizontal axis in FIG. 4 may correspond to a distance difference, i.e., a difference between a distance of a path of the reference light and a total distance of a distance of a path of the inspection light and a distance of a path of the scattered light.

A distance, to the receiving apparatus 14, traveled by the scattered light may be longer as the scattered light is generated at a position more distant from the transmitting apparatus 12. Therefore, the intensity of the scattered light at the time of reception of the scattered light may decrease, for example, due to further scattering in the air.

The scattered light processor 44 may acquire the reception time of the reference light determined by the reference light processor 42. The scattered light processor 44 may convert the output signal from the second photoelectric converter 36 into a digital signal. The scattered light processor 44 may accumulate the digital signal after the conversion for a predetermined time period from the reception time of the reference light. In one example, the aforementioned predetermined time period may be set to, for example, a time period during which the inspection light is transmitted in a single transmission direction. Thereafter, the scattered light processor 44 may determine the over-time transition of the output from the second photoelectric converter 36 on the basis of the accumulated pieces of information. As the output from the second photoelectric converter 36 may include the scattering signal, the determined over-time transition of the output from the second photoelectric converter 36 may correspond to the over-time transition of the intensity of the scattered light.

In FIG. 4, a dashed and single-dotted line B10 indicates an over-time transition of the output from the second photoelectric converter 36 in a case where the target 10 is not present in the transmission direction of the inspection light. In this case, a slope of the dashed and single-dotted line B10 indicating the over-time transition of the output from the second photoelectric converter 36 may be approximately constant independently of time. In other words, the output from the second photoelectric converter 36 may gradually decrease at an approximately-constant rate as time elapses.

In contrast, in FIG. 4, a solid line B12 indicates an over-time transition of the output from the second photoelectric converter 36 in a case where the stealth target 10 is present in the transmission direction of the inspection light.

As described above, in a case where the stealth target 10 is present on the transmission path of the inspection light, the detection of the scattered light may be disrupted in direction in which the transmission path of the inspection light is extended beyond the target 10. In FIG. 4, as indicated by the solid line B12, the output from the second photoelectric converter 36 may greatly decrease at a time T1. Accordingly, it may be estimated that the stealth target 10 or at least some kind of target 10 is present at a position, on the transmission path of the inspection light, corresponding to the time T1.

In view of the above, the target detector 46 may acquire the over-time transition of the output from the second photoelectric converter 36, i.e., the over-time transition of the intensity of the scattered light, determined by the scattered light processor 44. The target detector 46 may detect the target 10 on the basis of the over-time transition of the output from the second photoelectric converter 36, i.e., the over-time transition of the intensity of the scattered light.

In a specific but non-limiting example, the target detector 46 may determine whether the output from the second photoelectric converter 36, i.e., the intensity of scattered light, becomes equal to or smaller than a predetermined first transition in the over-time transition of the output from the second photoelectric converter 36, i.e., the over-time transition of the intensity of scattered light. A dashed and double-dotted line B14 in FIG. 4 indicates the predetermined first transition. The predetermined first transition may be set to a transition that is lower by a predetermined value or more than a lower limit of the expected over-time transition of the intensity of the scattered light. The expected over-time transition of the intensity of the scattered light may be, for example, indicated by the dashed and single-dotted line B10 in FIG. 4. The predetermined first transition may be therefore so set as to allow for distinction between presence and absence of detected scattered light.

In a case where the output from the second photoelectric converter 36, i.e., the intensity of the scattered light, does not become equal to or smaller than the first transition, the target detector 46 may determine that the target 10 is not present. It is to be noted that an extremely-long delay in the reception time of the scattered light compared with the reception time of the reference light, i.e., an extremely-long transmission distance of the inspection light, can also cause the output from the second photoelectric converter 36 to become equal to or smaller than the first transition even when the target 10 is not present. Such a case may be excluded from the determination described above.

The target detector 46 may set in advance an upper limit of the time to be determined, that is, an upper limit of the delay time of the scattered light with respect to the reception time of the reference light.

In contrast, in a case where the output from the second photoelectric converter 36, i.e., the intensity of the scattered light, becomes equal to or smaller than the first transition, the target detector 46 may determine that the target 10 is present and identify a position of the target 10. The target detector 46 may determine the position of the target 10 on the basis of a time difference (T1−T0) between a time (the time T1) at which the intensity of the scattered light becomes equal to or smaller than the first transition and the reception time (the time T0) of the reference light.

Figure 5:
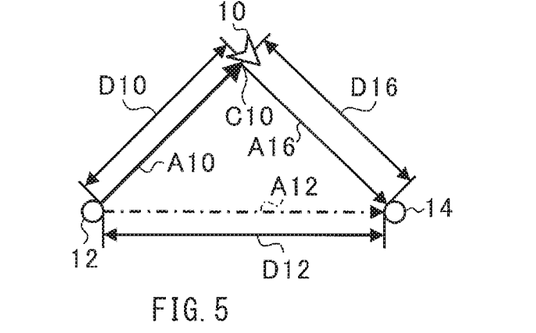
FIG. 5 is an explanatory diagram for describing an example of determination of a position of a target.

FIG. 5 describes the determination of the position of the target 10. The target detector 46 may determine, on the basis of the determined time difference (T1−T0), a distance difference between a total distance and a distance D12 of a path of the reference light. The total distance may be a sum of a distance D10 of a path of the inspection light and a distance D16 of a path of the scattered light. The target detector 46 may acquire the transmission direction of the inspection light and the transmission direction of the reference light both determined by the reference light processor 42. The target detector 46 may determine a scattering position C10 on the basis of the transmission direction of the inspection light, the transmission direction of the reference light, the determined distance difference, and the distance D12 of the path of the reference light. The scattering position C10 thus determined may correspond to the position of the target 10.

Figure 6:
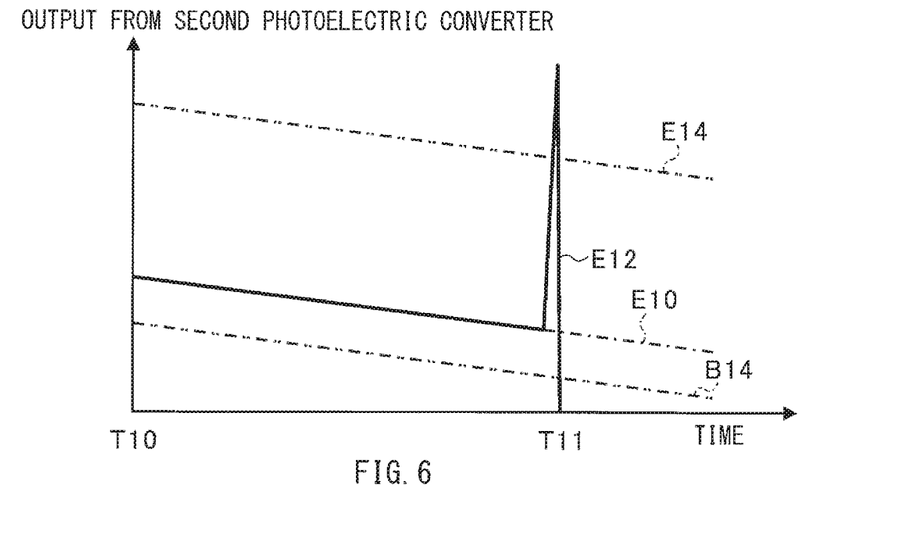
FIG. 6 is a diagram illustrating another example of the over-time transition of the output of the second photoelectric converter in a case where the inspection light is transmitted in a single transmission direction.

FIG. 6 illustrates another example of the over-time transition of the output from the second photoelectric converter 36 in the case where the inspection light is transmitted in a single transmission direction. In FIG. 6, a dashed and single-dotted line E10 indicates an over-time transition of the output from the second photoelectric converter 36 in a case where the target 10 is not present in the transmission direction of the inspection light. A solid line E12 indicates an over-time transition of the output from the second photoelectric converter 36 in a case where the non-stealth target 10 is present in the transmission direction of the inspection light. The over-time transition of the output from the second photoelectric converter 36 may approximately correspond to the over-time transition of the intensity of the scattered light. In FIG. 6, a time T10 indicates the reception time of the reference light and also indicates the reception time of the scattered light generated in the immediate vicinity of the transmitting apparatus 12.

When the inspection light hits the non-stealth target 10, reflected light having high intensity may be generated. In FIG. 6, a time T11 indicates a reception time of the reflected light derived from the inspection light that has hit the non-stealth target 10. In FIG. 6, as indicated by the solid line E12, the output from the second photoelectric converter 36 may increase greatly at one moment at the time T11. One reason for this is that not only the scattering signal but also the reflection signal is included in the output from the second photoelectric converter 36 at the time T11.

In a view of the above, the target detector 46 may determine whether the output from the second photoelectric converter 36 becomes greater than a predetermined second transition in the over-time transition of the output from the second photoelectric converter 36. A dashed and double-dotted line E14 in FIG. 6 indicates the predetermined second transition. The predetermined second transition may be set greater than the first transition. The predetermined second transition may be also set between an upper limit of an estimated over-time transition of the intensity of the scattered light and a lower limit of an estimated over-time transition of the intensity of the reflected light. The estimated over-time transition of the intensity of the scattered light may be, for example, that indicated by a dashed and single-dotted line E10 in FIG. 6. The estimated over-time transition of the intensity of the reflected light may be, for example, that in the vicinity of the time T11 on the solid line E12 in FIG. 6. The predetermined second transition may be therefore so set as to allow for distinction between presence and absence of detected reflected light having great intensity.

In a case where the output from the second photoelectric converter 36 becomes greater than the predetermined second transition, the target detector 46 may determine that the non-stealth target 10 is present, and determine a position of the target 10. The target detector 46 may determine the position of the target 10 on the basis of a time difference (T11−T10) between a time (the time T11) at which the output from the second photoelectric converter 36 becomes greater than the second transition and the reception time (the time T10) of the reference light.

In a case where the output from the second photoelectric converter 36 does not become greater than the predetermined second transition, it may be estimated that at least the non-stealth target 10 is not present.

After the reception time (the time T11) of the reflected light, the output from the second photoelectric converter 36 may become extremely smaller. One reason for this is that, also in a case where the target 10 is a non-stealth target, the scattered light may not be detected beyond the target 10.

Referring again to FIG. 4, when the inspection light hits the stealth target 10, the intensity of the light reflected by the target 10 may become extremely smaller. In FIG. 4, as the intensity of the reflected light is extremely smaller, an amount of increase in the output from the second photoelectric converter 36 at the time T1 is extremely smaller. That is, in a case where the target 10 is a stealth target, the output from the second photoelectric converter 36, i.e., the intensity of the scattered light, does not become greater than the second transition (the dashed and double-dotted line E14 in FIG. 4), and become equal to or smaller than the first transition in the over-time transition of the output from the second photoelectric converter 36. In the above-described case, the target detector 46 may determine that the target 10 is a stealth target.

Figure 7:
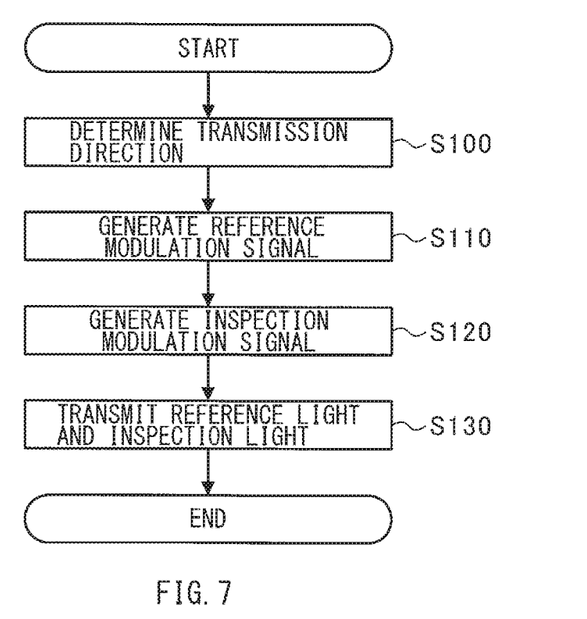
FIG. 7 is a flowchart for describing an example of operation of a transmission controller of a transmitting apparatus.

FIG. 7 is a flowchart for describing operation of the transmission controller 28 of the transmitting apparatus 12. FIG. 7 illustrates a flow of a process of transmitting the inspection light in a single transmission direction.

First, the transmission controller 28 may determine the transmission direction of the inspection light (S100). In a case where the current transmission direction is a first transmission direction of the scanning, the transmission controller 28 may set an initial value of the transmission direction of the inspection light. In contrast, in a case where the current transmission direction is not the first transmission direction of the scanning, the transmission controller 28 may determine the transmission direction of the inspection light to be a transmission direction corresponding to that immediately after the previous transmission direction in the scanning order. The transmission controller 28 may supply the inspection light transmitter 22 with an azimuth angle and an elevation angle both corresponding to the determined transmission direction.

Thereafter, the transmission controller 28 may generate a reference modulation signal that includes information indicating the transmission direction of the inspection light and information indicating the transmission direction of the reference light (S110). Thereafter, the transmission controller 28 may generate an inspection modulation signal (S120).

Thereafter, in step S130, the transmission controller 28 may cause the reference laser oscillator 24 to oscillate on the basis of the reference modulation signal, and cause the reference light transmitter 26 to transmit the reference light toward the receiving apparatus 14. In step S130, the transmission controller 28 may also cause the inspection laser oscillator 20 to oscillate on the basis of the inspection modulation signal, and cause the inspection light transmitter 22 to transmit the inspection light toward the target in-air region 18. At this time, the transmission controller 28 may cause the reference light and the inspection light to be transmitted at approximately the same time or at the same time. The transmission controller 28 may temporarily halt the transmission of the reference light and the inspection light after a predetermined time elapses from start of the transmission of the reference light and the inspection light.

The transmission controller 28 may repeatedly perform the respective processes illustrated in FIG. 7 on the entire target in-air region 18. In other words, the transmission controller 28 may repeatedly perform the transmission of the inspection light and the reference light for each transmission direction of the inspection light, in other words, for each angle of the scanning.

Figure 8:
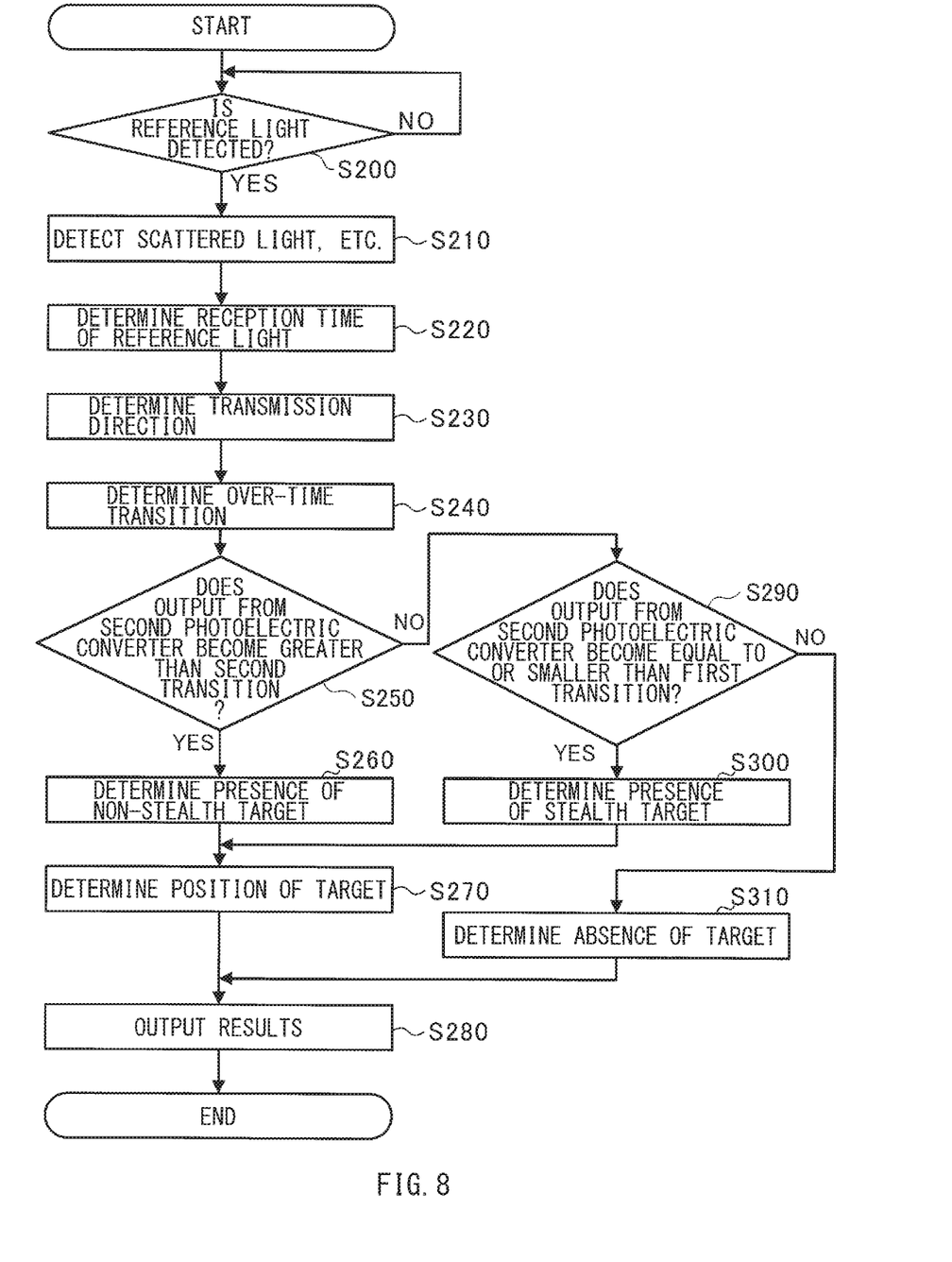
FIG. 8 is a flowchart for describing an example of operation of a receiving apparatus.

FIG. 8 is a flowchart for describing operation of the receiving apparatus 14. Upon receiving light, the photodetector 30 of the receiving apparatus 14 may detect whether the received light includes at least the reference light (S200). In a specific but non-limiting example, the spectrometer 32 may spectrally separate the received light, and the first photoelectric converter 34 may detect the reference light.

In a case where the received light does not include the reference light (NO in S200), the photodetector 30 may wait until the reference light is received.

In contrast, in a case where the received light includes the reference light (YES in S200), the photodetector 30 may also detect the scattered light and the reflected light in addition to the reference light (S210). In a specific but non-limiting example, the spectrometer 32 may spectrally separate the received light, and the first photoelectric converter 34 may detect the reference light. In addition, the second photoelectric converter 36 may detect the scattered light and the reflected light. The photodetector 30 may continue the detection of the reference light, the scattered light, and the reflected light for a predetermined time period from the start of reception of the reference light. For example, the photodetector 30 may continue the detection of the reference light, the scattered light, and the reflected light from the start of reception of the reference light until the scanning shifts to the next angle.

Thereafter, the reference light processor 42 may determine the reception time of the reference light on the basis of the output signal from the first photoelectric converter 34 (S220). The reception time of the reference light may correspond to the reception time of the scattered light generated in the immediate vicinity of the transmitting apparatus 12.

Thereafter, the reference light processor 42 may determine the transmission direction of the inspection light and the transmission direction of the reference light on the basis of the output signal from the first photoelectric converter 34 (S230). The transmission direction of the inspection light and the transmission direction of the reference light may be used to identify the position of the target 10.

Thereafter, the scattered light processor 44 may determine the over-time transition of the output from the second photoelectric converter 36, i.e., the intensity of the scattered light, for a single transmission direction (S240). At this time, the scattered light processor 44 may regard the reception time of the reference light as a reference time of the reception time of the scattered light, and thereby determine the over-time transition of the output from the second photoelectric converter 36.

Thereafter, the target detector 46 may determine whether the output from the second photoelectric converter 36 becomes greater than the second transition in the over-time transition of the output from the second photoelectric converter 36 (S250).

In a case where the output from the second photoelectric converter 36 becomes greater than the second transition (YES in S250), as this case may correspond to detection of the reflected light having great intensity, the target detector 46 may determine that the non-stealth target 10 is present (S260).

After step S260, the target detector 46 may determine the position of the target 10 (S270). In a specific but non-limiting example, the target detector 46 may determine the position, on the transmission path of the inspection light, corresponding to a time at which the output from the second photoelectric converter 36 becomes greater than the second transition, on the basis of a time difference between the time at which the output from the second photoelectric converter 36 becomes greater than the second transition and the reception time of the reference light. The target detector 46 may set the determined position as the position of the non-stealth target 10.

After step S270, the target detector 46 may output results of the processes performed in the respective steps S260 and S270 (S280). For example, the target detector 46 may output that the target detector 46 has detected the non-stealth target 10 and also output the position of the detected target 10.

In contrast, in a case where the output from the second photoelectric converter 36 does not become greater than the second transition (NO in S250), the target detector 46 may determine whether the output from the second photoelectric converter 36, i.e., the intensity of the scattered light, is equal to or smaller than the first transition (S290).

In a case where the output from the second photoelectric converter 36 is equal to or smaller than the first transition (YES in S290), the target detector 46 may determine that the stealth target 10 is present (S300).

After step S300, the target detector 46 may determine the position of the target 10 (S270). In a specific but non-limiting example, the target detector 46 may determine the position, on the transmission path of the inspection light, corresponding to a time at which the output of the second photoelectric converter 36, i.e., the intensity of the scattered light, becomes equal to or smaller than the first transition. The target detector 46 may perform the above-described determination on the basis of a time difference between the time at which the output from the second photoelectric converter 36, i.e., the intensity of the scattered light, becomes equal to or smaller than the first transition and the reception time of the reference light. The target detector 46 may set the determined position as the position of the stealth target 10.

After step S270, the target detector 46 may output results of the processes performed in the respective steps S260 and S270 (S280). For example, the target detector 46 may output that the target detector 46 has detected the stealth target 10 and also output the position of the detected target 10.

In contrast, in a case where the output from the second photoelectric converter 36 does not become equal to or smaller than the first transition (NO in S290), the target detector 46 may determine that the target 10 is not present (S310), and output the result (S280).

The transmitting apparatus 12 may transmit the reference light for each transmission direction of the inspection light. The receiving apparatus 14 may therefore perform a series of processes illustrated in FIG. 8 every time the reference light is detected.

In a case where next reference light is not detected after the predetermined time period has elapsed, the receiving apparatus 14 may regard the case as completion of the scanning of the target in-air region 18, and output the detection results related the target 10 determined so far.

In the flowchart illustrated in FIG. 8, the target detector 46 may determine whether the output from the second photoelectric converter 36 becomes greater than the second transition in step S250. This is, however, non-limiting. In one example embodiment, the target detector 46 may not determine whether the output from the second photoelectric converter 36 becomes greater than the second transition and may determine instead whether the output from the second photoelectric converter 36 is equal to or smaller than the first transition. In this example embodiment, the target detector 46 may be able to detect some kind of target 10 including the stealth target 10 in a case where the output from the second photoelectric converter 36 becomes equal to or smaller than the first transition.

As described above, the target detection system 1 according to one example embodiment detects the scattered light generated on the transmission path of the inspection light. The target detection system 1 determines, in a case where the intensity of the scattered light becomes equal to or smaller than the first transition, as the position of the target 10, the position, on the transmission path, corresponding to the time at which the scattered light becomes equal to or smaller than the first transition. The target detection system 1 performs the above-described determination on the basis of the time difference between the time at which the intensity of the scattered light becomes equal to or smaller than the first transition and the reception time of the reference light.

Therefore, according to the target detection system 1 of one example embodiment, it is possible to detect the target 10 present at a position in the in-air region by means of light.

The target detection system 1 according to one example embodiment may determine that the target 10 is the non-stealth target 10 in a case where the intensity of the scattered light becomes greater than the second transition in the over-time transition of the intensity of the scattered light. The target detection system 1 according to one example embodiment may also determine that the target 10 is the stealth target 10 in a case where the intensity of the scattered light does not become greater than the second transition and becomes equal to or smaller than the first transition in the over-time transition of the intensity of the scattered light. The target detection system 1 of one example embodiment is therefore able to clearly distinguish whether the target 10 is the stealth target 10 or the non-stealth target 10 and identify whether the target 10 is the stealth target 10 or the non-stealth target 10.

The target detection system 1 according to one example embodiment may include the transmitting apparatus 12 and the receiving apparatus 14 that are located in the air upon detecting the target 10. The target detection system 1 according to one example embodiment is therefore able to allow the angle of the scattered light with respect to the inspection light and the angle of the reflected light with respect to the inspection light to be greater, as compared with a case where the transmitting apparatus 12 and the receiving apparatus 14 are provided on the ground. This makes it possible to detect the scattered light and the reflected light with higher accuracy, as compared with the case where the transmitting apparatus 12 and the receiving apparatus 14 are provided on the ground.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in a case where the intensity of the scattered light becomes equal to or smaller than the first transition in the above-described example embodiment, the target detector 46 may perform local scanning (main scanning) on the vicinity of the position, on the transmission path of the inspection light, corresponding to the time at which the detection of the scattered light is disrupted, in order to improve accuracy of identifying the position of the target 10.

In a specific but non-limiting example, the receiving apparatus 14 may also be provided with an inspection laser oscillator and an inspection light transmitter. In a case where the intensity of the scattered light becomes equal to or smaller than the first transition, the target detector 46 may determine that the stealth target 10 is present, and tentatively determine a position of the target 10. Thereafter, the target detector 46 may cause the inspection laser oscillator to output auxiliary inspection light, and cause the inspection light transmitter to perform scanning with the use of the auxiliary inspection light. The auxiliary inspection light may be, for example, laser light. At this time, the inspection light transmitter may perform the scanning with the position of the target 10 determined earlier as the center and the transmission direction of the inspection light from the transmitting apparatus 12 as the scanning direction.

Thereafter, the target detector 46 may receive scattered light derived from the auxiliary inspection light, i.e., auxiliary scattered light, and determine an over-time transition of the intensity of the auxiliary scattered light. The target detector 46 may correct the position of the target 10 on the basis of a time at which the intensity of the auxiliary scattered light becomes equal to or smaller than the first transition in the over-time transition of the intensity of the auxiliary scattered light and the transmission direction of the auxiliary inspection light. According to the above-described example embodiment, it is possible to detect the stealth target 10 with higher accuracy. It is to be noted that, in one example embodiment, the local scanning described above may be also performed in a case of determining the position of the non-stealth target 10.

In the above-described example embodiment, the inspection light transmitter 22 may scan the target in-air region 18 by means of the inspection light. The target detection system 1 is, however, not limited to the example in which the inspection light transmitter 22 scans the target in-air region 18. In one example embodiment, the inspection light transmitter 22 may transmit the inspection light over 360 degrees in the horizontal direction. In another example embodiment, the inspection light transmitter 22 may transmit the inspection light only in a predetermined transmission direction.

In the above-described example embodiment, the first transition, which is the reference directed to determining of the intensity of the scattered light, and the second transition, which is the reference directed to determining of the intensity of the reflected light, may be approximately parallel to the estimated over-time transition of the intensity of the scattered light, and vary over time. In one example embodiment, however, a first threshold which is a fixed value may be used as the reference directed to the determining of the intensity of the scattered light, and a second threshold which is a fixed value may be used as the reference directed to the determining of the intensity of the reflected light.

Each of the transmission controller 28, the signal processor 40, the reference light processor 42, the scattered light processor 44, and the target detector 46 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the transmission controller 28, the signal processor 40, the reference light processor 42, the scattered light processor 44, and the target detector 46 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the transmission controller 28, the signal processor 40, the reference light processor 42, the scattered light processor 44, and the target detector 46 illustrated in FIG. 3.

The invention claimed is:

1. A target detection system comprising:
a transmitting apparatus; and
a receiving apparatus separated from the transmitting apparatus,
the transmitting apparatus including
an inspection light transmitter configured to transmit inspection light, and
a reference light transmitter configured to transmit reference light to the receiving apparatus,
the receiving apparatus including
a photodetector configured to receive light and detect scattered light and the reference light from the received light, the scattered light being scattered in a transmission path of the inspection light,
a scattered light processor configured to determine an over-time transition of intensity of the scattered light detected by the photodetector, and
a target detector configured to perform target position determination in a case where the intensity of the scattered light becomes equal to or smaller than a predetermined first transition in the over-time transition of the intensity of the scattered light, the target position determination determining, as a position of a target, a position, on the transmission path, corresponding to a first-transition time, the first-transition time being a time at which the intensity of the scattered light becomes equal to or smaller than the first transition, the target position determination being performed on a basis of a time difference between the first-transition time and a reception time of the reference light.

2. The target detection system according to claim 1, wherein the target detector is configured to determine that the target is a non-stealth target in a case where the intensity of the scattered light is greater than a predetermined second transition in the over-time transition of the intensity of the scattered light, and to determine that the target is a stealth target in a case where the intensity of the scattered light does not become greater than the second transition but becomes equal to or smaller than the first transition in the over-time transition of the intensity of the scattered light, the second transition being greater than the first transition.

3. The target detection system according to claim 1, wherein the transmitting apparatus and the receiving apparatus are each positioned in air.

4. The target detection system according to claim 2, wherein the transmitting apparatus and the receiving apparatus are each positioned in air.

5. A target detection system comprising:
a transmitting apparatus; and
a receiving apparatus separated from the transmitting apparatus,
the transmitting apparatus including
an inspection light transmitter configured to transmit inspection light, and
a reference light transmitter configured to transmit reference light to the receiving apparatus,
the receiving apparatus including
a photodetector configured to receive light and detect scattered light and the reference light from the received light, the scattered light being scattered in a transmission path of the inspection light, and
circuitry configured to
determine an over-time transition of intensity of the scattered light detected by the photodetector, and
perform target position determination in a case where the intensity of the scattered light becomes equal to or smaller than a predetermined first transition in the over-time transition of the intensity of the scattered light, the target position determination determining, as a position of a target, a position, on the transmission path, corresponding to a first-transition time, the first-transition time being a time at which the intensity of the scattered light becomes equal to or smaller than the first transition, the target position determination being performed on a basis of a time difference between the first-transition time and a reception time of the reference light.

* * * * *